United States Patent [19]
Boucherie

[11] 3,762,274
[45] Oct. 2, 1973

[54] DEVICES FOR AUTOMATICALLY SHAPING AND PROFILING WORKPIECES

[76] Inventor: Gerard B. Boucherie, Potaadestraat 1, Rumbeke, Belgium

[22] Filed: Nov. 10, 1969

[21] Appl. No.: 875,363

[30] Foreign Application Priority Data
Nov. 18, 1968 Belgium .............................. 723970

[52] U.S. Cl. ................................ 90/13 B, 90/13.4
[51] Int. Cl. ............................................. B23b 1/18
[58] Field of Search ................. 90/13.4, 13.7, 13.9, 90/13 B; 51/101 R; 33/23 H, 27 K, 18 B; 144/144 R, 144 A

[56] References Cited
UNITED STATES PATENTS
1,924,003  8/1933  Shaw et al. ........................ 90/13 B X
3,437,007  4/1969  Schmermund ........................ 90/13.9

*Primary Examiner*—Gil Weidenfeld
*Attorney*—Bacon and Thomas

[57] ABSTRACT

A device for improving shaping and profiling milling machines, according to which means are provided to impart, between the milling cutter or cutters and the workpiece, an additional relative displacement in order to influence the feeding velocity of the workpiece with respect to the milling cutter or cutters.

10 Claims, 20 Drawing Figures

PATENTED OCT 2 1973

INVENTOR.
GERARD B. BOUCHERIE
BY Bacon & Thomas
ATTORNEYS

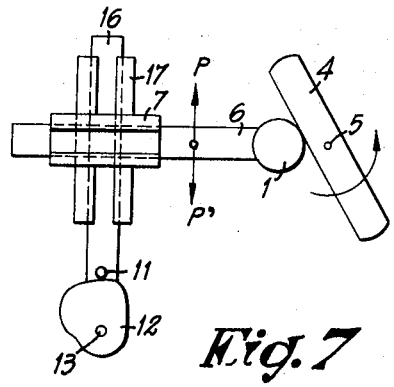
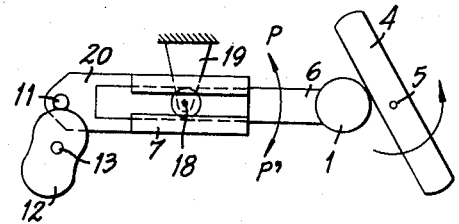
Fig.7   Fig.8
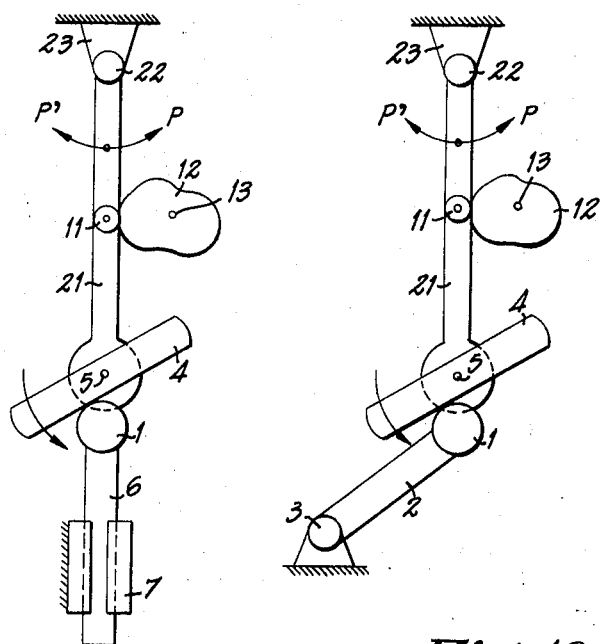
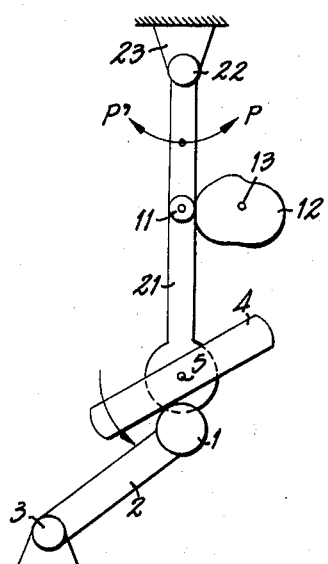
Fig.9   Fig.10

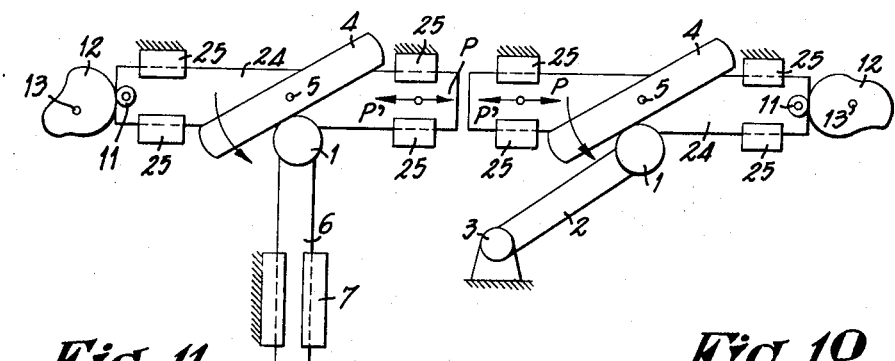
Fig. 11  Fig. 12
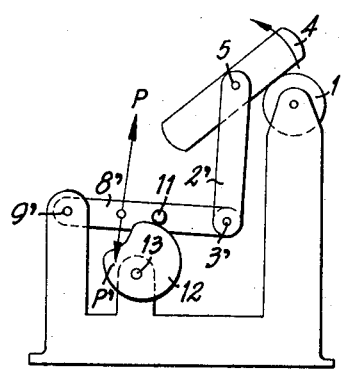 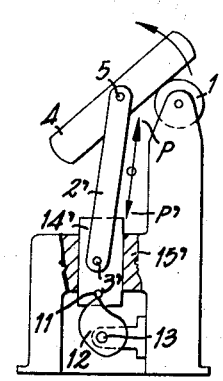
Fig. 13  Fig. 14
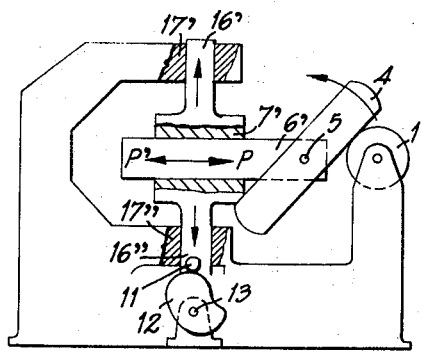 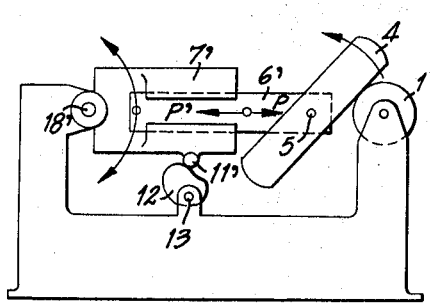
Fig. 15  Fig. 16
INVENTOR.
GERARD B. BOUCHERIE
BY Bacon & Thomas
ATTORNEYS

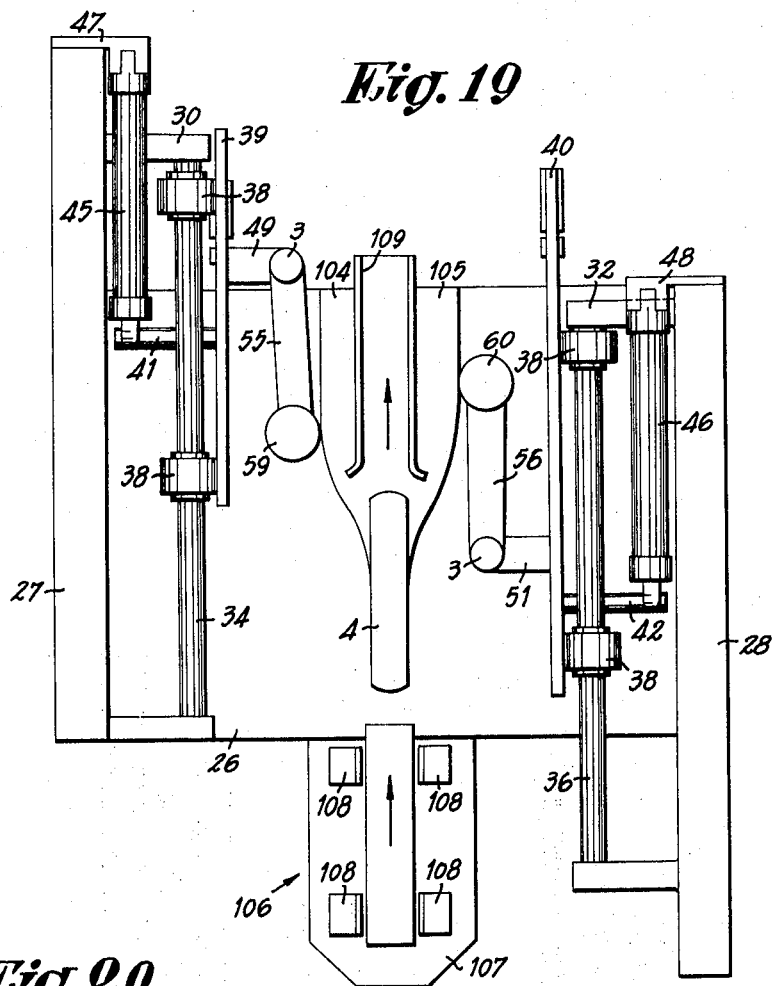
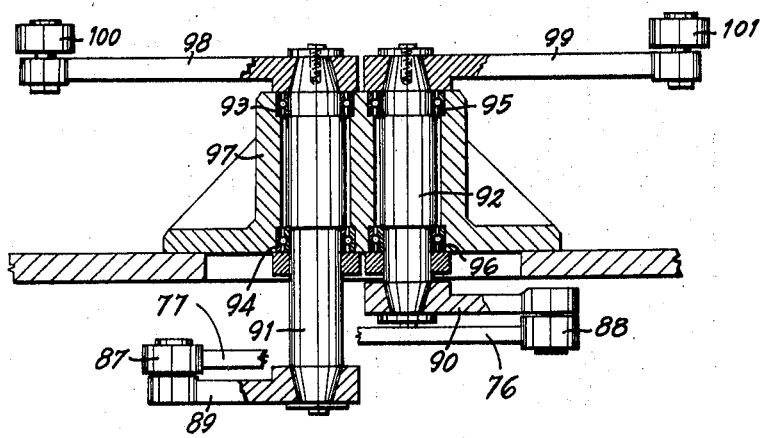

DEVICES FOR AUTOMATICALLY SHAPING AND PROFILING WORKPIECES

The present invention relates to improvements to devices for automatically shaping and eventually profiling, by means of milling, workpieces, these operations being carried out in one phase over the whole periphery of the workpiece.

More particularly, the device to which apply the improvements according to the invention is of the type wherin the workpiece to be milled, which is maintained in a gripping device, is given a constant rotary movement, while the milling cutters proper are so moved with appropriate templates turning together with the abovementioned gripping device, that they mill the piece of work to the desired shape and eventually profile it at the same time.

The improvements according to the invention may also be applied to devices of the type wherein the milling cutter spindle is carried by a frame and wherein the workpiece to be milled is given a rotary movement, while the workpiece-holder assembly being such, that templates, which are rotation together with said holder, move the workpiece with respect to the milling cutter so that the workpiece is milled to the desired shape and eventually simultaneously profiled.

Such known milling cutters are mounted either on a slide or on a swinging arm, whereby, due to the constant rotary movement of said templates, these milling cutters undergo either a translatory motion along the axis of movement of the slide to which they are fixed, or an oscillatory motion around the center of rotation of the corresponding swinging arm.

As the shape of the workpiece is always differing and as the gripping device has a constant angular velocity, the feeding velocity of the workpiece with respect to the milling cutter or cutters, is subjected to large variations.

These variations are very often detrimental to the surface cleanness of the milled surface.

Another disadvantage of these known devices is that in some instances the milling devices, due to the very shape of the workpiece and of the template, will take such positions that the followers of the milling devices will drag on the templates, and in extreme cases, even "seize."

The present invention has for its object improvements which systematically eliminate the above mentioned and other disadvantages of the existing devices and thus eliminate the restrictions of the existing shaping and profiling devices and thus increase their possibilities.

For this purpose the improvements according to the invention mainly consist of means intended to impart, during the milling operation, an additional movement to the milling cutters, or to the rotating workpiece; either a displacement of the center of rotation of the swinging arm of each milling cutter, or of each gripping device of the workpiece; or a rotary or translatory displacement, of the support by which the slide movably carried together with the milling cutter, or with the gripping device, or a displacement of the slide itself.

Such an additional movement ensures that the feeding velocity of the workpiece with respect to the milling cutter and the position of the milling cutter with respect to the workpiece can be set according to the requirements of the operation to be carried out, these requirements depending on the shape, the nature and eventually also the grain of the material of the workpiece.

The considered improvements to devices for automatically shaping and profiling workpieces consist, for this purpose, mainly in providing, to such devices wherein the workpiece performs a constant rotary movement and wherein the milling devices, or the gripping devices for the workpiece, are displaced under the control of follower rollers running on a template, an additional relative movement of the milling cutters with respect to the workpiece.

In order to better point out the features of the present invention, some preferred embodiments thereof are described hereunder, by way of example and without any restriction referring to the accompanying drawings, in which:

FIGS. 1 to 4 schematically show four possible structures of known devices for shaping and/or profiling workpieces;

FIGS. 5 to 12 schematically show various embodiments according to the invention for imparting to the milling devices an additional movement according to the invention;

FIGS. 13 to 16 schematically show various embodiments according to the invention for imparting to the gripping device an additional movement with respect to the fixed milling cutter;

FIG. 19 is a top view similar to that of FIG. 18, but in a second characteristic position;

FIG. 20 schematically shows a drive mechanism providing for the additional displacement of the milling cutters during the milling operation.

In FIGS. 1 to 4 are schematically shown dispositions by means of which the workpieces are machined by conventional shaping and profiling machines.

Figure 1:
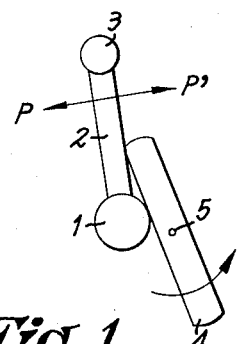

In the case of FIG. 1, the milling cutter 1 is attached to a swinging arm 2 oscillating around a fixed swinging point 3, whereby the milling cutter 1 is suitably driven at a constant angular velocity. The milling cutter 1 follows the desired path determined by the cooperation of a follower roller (not shown) with a template. The workpiece 4 is equally driven at a constant angular velocity around an axis 5.

Figure 2:
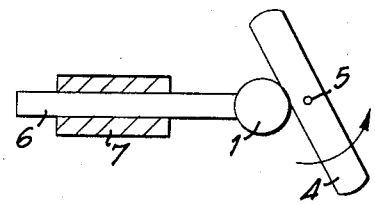

In the embodiment according to FIG. 2, the milling cutter 1 is fixed on a slide which is movably carried by a guide 7. In this case the milling cutter 1 is also driven at a constant angular velocity a given template brought in contact with the workpiece 4 according to said workpiece also rotates, as in the embodiment according to FIG. 1, at a constant angular velocity around an axis 5.

Figure 3:
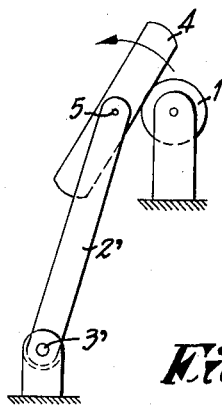

In the embodiment according to FIG. 3, the milling cutter 1 is directly rotatably supported by the frame of the device, while the workpiece 4, is revolvably fixed via axis 5, on a swinging arm 2' which may turn around a point 3'. The workpiece 4 is given a constant angular velocity.

Figure 4:
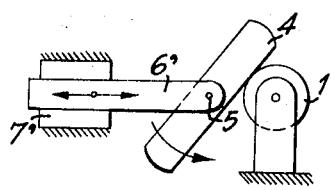

In the embodiment of FIG. 4, the milling cutter 1 is also revolvably carried by the frame, while the workpiece 4, driven at a constant angular velocity, is fixed via the axis 5 on a slide 6' movable in a guide 7'.

In such known embodiments the feeding velocity of the workpiece with respect to the milling cutter is subject to large variations. Indeed, when the workpiece in FIGS. 1 to 4 is in a vertical position, a smaller feed of the milling cutters 1 occurs than when said workpiece is in the position as shown in said FIGS. 1 to 4.

According to the present invention, during the constant rotation of the workpiece 4, the milling cutter 1 is displaced over a given distance with respect to the workpiece, or alternately, the workpiece is displaced with respect to the milling cutter, in order to influence the feeding velocity of the workpiece with respect to said milling cutter 1 over the whole periphery of the workpiece.

Thus, not only is a uniformly divided load of the milling cutter and other machine parts achieved, but also the machining of the workpiece 4 is of a more constant quality, this being often indispensable, with certain materials to obtain an even aspect of the machined workpiece.

Figure 5:
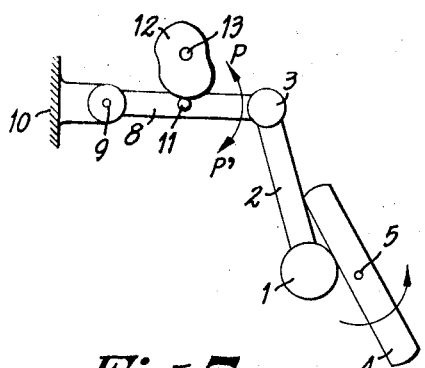
Figure 6:
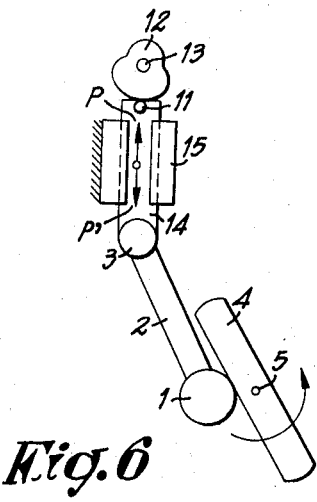
Figure 17:
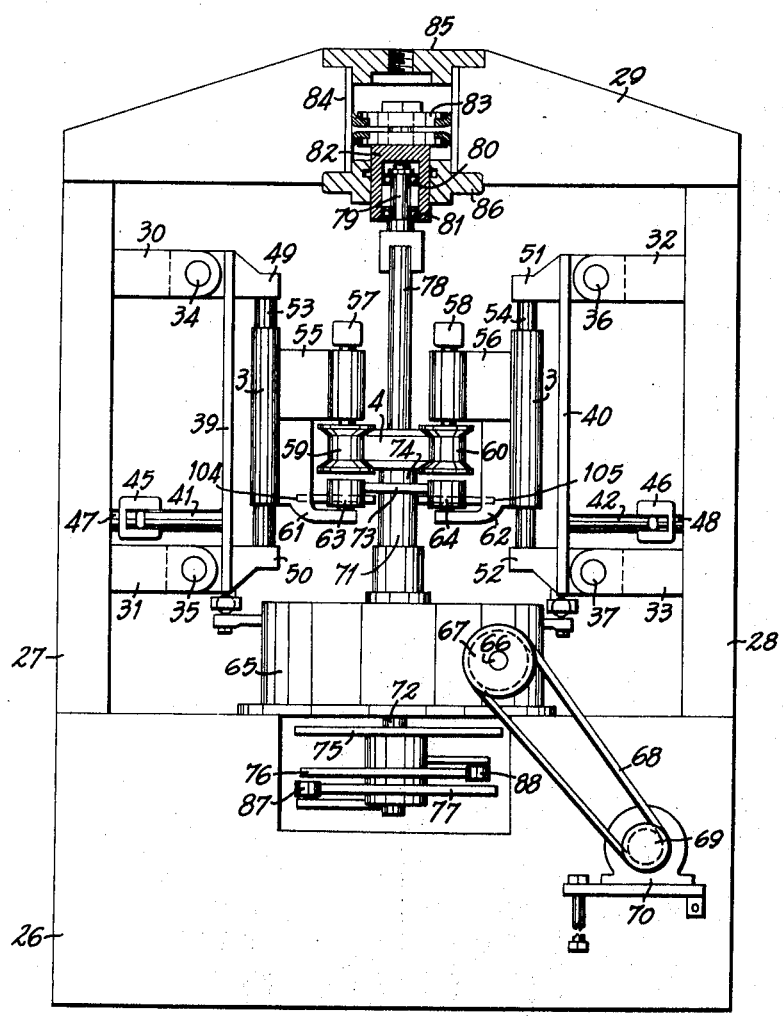
FIG. 17 is a front elevation of a machine embodying the improvements according to the invention, wherein, for the sake of clearness, various parts, i.a. the magazines are omitted.
Figure 18:
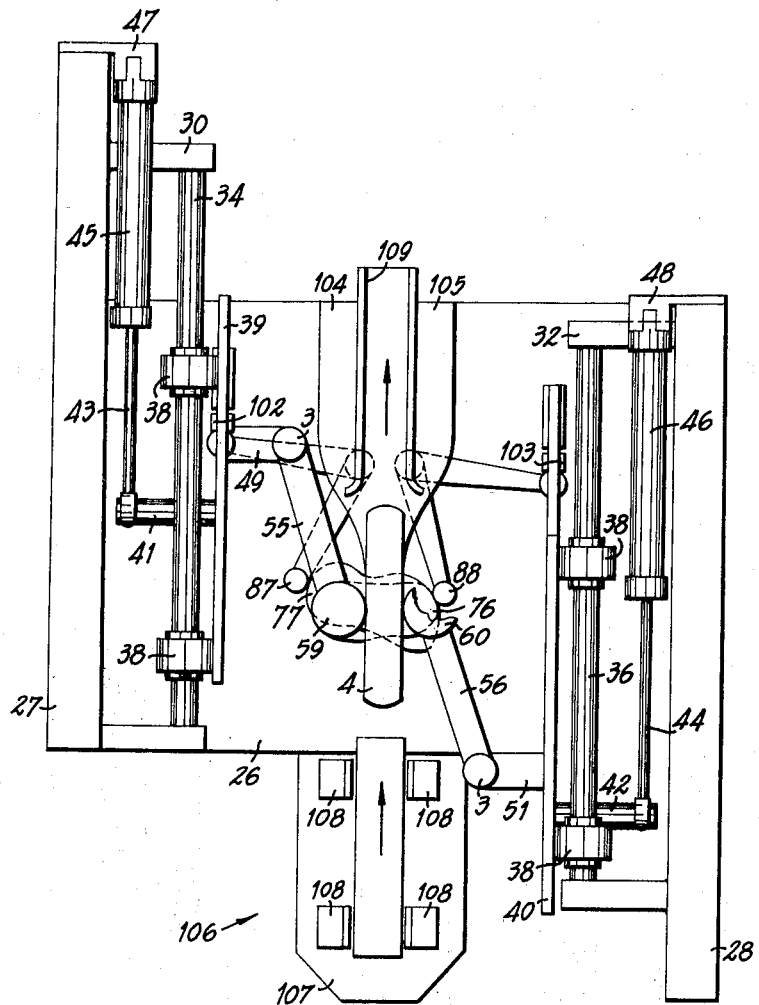
FIG. 18 is a top view of the machine according to FIG. 17, but wherein the upper part is omitted.

In FIGS. 5 and 6 are shown devices which make possible such additional displacement of the milling cutters 1 with respect to the workpiece 4 when they are applied to a device as shown in FIG. 1.

In FIG. 5 the swinging arm 2 is hingedly connected at its turning spindle 3 to a second swinging arm 8 which, towards its other end is hingedly connected by means of a spindle 9 to the frame 10 of the device. In a point between the aforesaid ends of the lever 8, a freely rotating travelling roller 11 is carried by the latter, said roller cooperating with a cam 12 firmly fixed to a driving axle 13.

In FIG. 6, the lever 2 is hingedly connected, by spindle 3, with a slide 14 which can move in a suitable fixed guide 15, said slide being provided, towards one end thereof with a travelling roller 11 cooperating with a cam 12, also fixed on a driving axle 13.

In the arrangement according to FIG. 5, as well as in that according to FIG. 6, the swinging arms 2 are urged by springs or the like, in order to constantly press the follower roller corresponding to the milling cutter 1 against the corresponding template and thus press the milling cutter 1 at the same time against the workpiece 4. In these embodiments springs or the like are also provided to urge the lever 8, or the slide 14, in order to keep the follower roller 11 continuously in contact with the cam 12.

During the constant rotation of the workpiece 4 and the corresponding displacement of the milling cutter, along the aforesaid template, against which the follower roller of the lever 2 is pressed, the milling cutter 1 will work the periphery of the workpiece 4.

When the workpiece comes in such a position that the feeding velocity tends to increase, the milling cutter is moved, through said cam 12, follower roller 11 and corresponding lever 8 or slide 14, in the direction of arrow P'; while, when the feeding velocity tends to decrease, the milling cutter 1 will be moved, along the cam 12, in the direction opposite to that of the displacement of the workpiece 4, in other words along arrow P.

Thus, depending on the shape of cam 12, the milling cutter 1 is imparted an additional displacement, with respect to the shape and profiling operation which said milling cutter exerts on the workpiece 4, by which means the feeding velocity of the workpiece 4 with respect to the milling cutter 1 is kept as constant as possible, the periphery of the workpiece 4 is being thus worked very uniformly, while the load of the milling cutter 1 becomes as uniform as possible.

In FIGS. 7 and 8 are shown devices providing for such additional displacement of the milling cutter 1 with respect to the workpiece 4 in a device of the type shown in FIG. 2.

In FIG. 7 the slide 6, carrying the milling cutter 1, is placed in the aforesaid guide 7, whereby this guide is fixed on a slide 16 which is movably located in a guide 17 fixed with respect to the frame of the device. On the slide 16 is pivoted the aforesaid follower roller 11 which cooperates with cam 12.

In FIG. 8 the slide 7 is connected by means of a spindle 18 with a support 19, whereby the slide 7 is provided at its rear with an extension 20 on which is pivoted the follower roller 11 cooperating with the cam 12.

In the case of FIG. 7 the additional displacement of the milling cutter 1 along the arrows P-P' is obtained by moving the slide 6 together with the guide 7 with respect to the workpiece, whilst in FIG. 8, this additional displacement along arrows P-P' is obtained by having the slide 6 swing around the center of rotation 18.

In all these possible arrangements, which are given by way of example, the axis of rotation 5 of the workpiece 4 occupies an invariable location on the frame of the machine, so that the additional relative displacement between the workpiece and the milling cutter 1 is obtained by displacement of the milling cutter 1 itself.

Such a relative displacement may obviously be obtained also by moving the workpiece 4 alone or the workpiece 4 and the milling cutter 1 simultaneously.

As an example of this, in FIGS. 9 to 12 some arrangements are shown wherein the milling cutter 1 is given the conventional known movement, while the additional relative displacement between the milling cutter 1 and the workpiece 4 is obtained in this instance by displacement of the workpiece 4 itself during its rotary movement.

In the embodiment according to FIG. 9 the workpiece 4 is pivoted through the axis 5 on a swinging lever 21 which is pivoted by means of a spindle 22 to a support 23 fixed on the frame. The aforesaid follower roller 11 is pivoted on the lever 21 and cooperates with the cam 12. In this instance the milling cutter 1 is rotatably fixed on the slide 6 moving in the guide 7.

The arrangement according to FIG. 10 is identical to that of FIG. 9, but here, the milling cutter 1 is rotatably fixed on the aforesaid swinging lever 2.

In FIGS. 11 and 12 the additional displacement along arrows P-P' is obtained by rotatably fixing the workpiece 4 by means of axis 5 on a slide 24 which is movable in guides 25, said slide 24 carrying the aforesaid follower roller 11 which cooperates with cam 12. In FIG. 11 the milling cutter 1 is rotatably fixed on a guide 6, while in FIG. 12 the milling cutter 1 is rotatably fixed on a swinging lever 2.

In FIGS. 13 and 14, finally, are shown schematic arrangements making use of the principle as shown in FIG. 3, while FIGS. 15 and 16 schematically show the application of the principle of FIG. 4.

In FIGS. 13 to 16 the milling cutter 1 is always rotatably carried by the frame of the machine.

In FIG. 13 the aforesaid additional relative displacement is obtained by fixing the lever 2' through the center of rotation 3' on a lever 8' which, itself, is hingedly fixed, around a center of rotation 9', to the frame. On the lever 8' a follower roller 11 is provided, cooperating with a suitable cam 12.

In FIG. 14 the swinging lever 2' is rotatably fixed, through spindle 3', on a slide 14' placed in a slide 15'.

In FIG. 15 the slide 6' is placed in a guide 7' forming a part of a second slide 16'-16''. The latter is placed in a guide 17'-17''.

Finally, the aforesaid relative displacement is obtained in FIG. 16 by placing the slide 6' in a guide 7' hinged at 18, whereby the aforesaid roller 11' is carried by this guide.

In all these arrangements the additional displacement is always obtained by the cooperation of a follower roller 11 with a cam 12, but nothing prevents such a displacement to be obtained by using hydraulic or pneumatic jacks, or all other suitable mechanical or electric means.

In FIGS. 17 to 20 is shown, by way of example, an embodiment of a device for shaping and/or profiling workpieces, in accordance with the principle of FIG. 6.

This device mainly consists of a base 26 provided with two vertical sides, respectively 27 and 28 on which a cross bridge 29 is fixed.

To each side 27 and 28 are fixed paired supports, 30, 31, 32 and 33, carrying axles 34-35-36 and 37 respectively. Each axle 34 to 37 carries by a pair of ball bearings 38 and for each side 27-28 these ball bearings are fixed to a supporting slide or plate, respectively 39 and 40. Each plate 39 and 40 forms, together with the corresponding ball bearings 38, a carriage which can move over the corresponding axles 34-37 respectively. Each plate 39-40 is moreover provided with a support, respectively 41-42 each connected with the piston rod, respectively 43-44 of a jack, respectively 45-46. These jacks are hingedly connected with supports, respectively 47 and 48, fixed themselves to the aforesaid sides 27 and 28.

On each of the plates 39 and 40 are finally fixed two bearing holders respectively 49-50 and 51-52, whereby each pair of bearings rotatably carrying a swinging arm, respectively 53-54. These arms each support a cutter head, respectively 55-56, whereby each cutter head is provided with a shaft on which are mounted a pulley, respectively 57-58, the milling cutter proper, 59 and 60, provided with the suitable profile.

On each of the aforesaid swinging arms 53, 54 is furthermore provided a projection, respectively 61-62, supporting a shaft, the latter rotatably carrying a follower roller, respectively 63-64.

On the base 26 is fixed a reduction box 65 whose driving shaft 66 is provided with a pulley 67 which, through a belt 68 and a second pulley 69, is driven by a suitable electric motor 70.

This reduction box 65 has a one-piece driven shaft of which one part 71 projects from the upper side of the reduction box and another part 72 projects from the lower side of the reduction box.

To the axle portion 71 is fixed a template 73, which determines the right shape of the finished workpiece. Said template is kept in its assigned place by a gripping sleeve 74 which simultaneously serves as a pressure support means for the workpiece 4. On the lower part 72 of said driven axle are fixed in succession: a program dial 75 on which are provided the various cams programing the cycle; a first cam 76 and a second cam 77.

The gripping device for fixing the workpiece 4 with respect to the milling cutters 59 and 60 is furthermore completed with an upper gripping sleeve 78 fixed to a rotatable shaft 79 which, through ball bearings, respectively 80 and 81, is supported in a housing 82. The latter is cylindrical and constitutes the piston rod of a double piston 83 which is provided with packings. This piston moves in a housing formed by a cylindric wall 84 and end pieces, respectively 85 and 86. The pieces 84-85 and 86 of said jack are fixed to the aforesaid cross bridge 29.

Such a device is provided according to the present invention, with means to impart to the slides or plates 39 and 40 a movement forming the additional movement which the milling cutter 1 of FIG. 4 carries out in this instance with respect to the workpiece to keep as constant as possible the feeding velocity of the workpiece with respect to the milling cutter.

Said means consist in this embodiment mainly of the aforesaid cams 76 and 77 which cooperate with follower rollers, respectively 87 and 88, each rotatably fixed on a lever, respectively 89-90. Said levers are firmly fixed at their other end to shafts, respectively 91 and 92, which are rotatably carried, through ball bearings, respectively 93-94 and 95-96, in a frame 97 fixed on the above mentioned base 26. The end of the aforesaid axles 91 and 92 is provided with a lever firmly fixed thereto, respectively 98-99, each provided towards their free end with a freely rotating follower roller, respectively 100-101.

Said follower rollers 100 and 101 cooperate with abutments, respectively 102 and 103, which are suitably fixed on the aforesaid plates 39 and 40.

The aforesaid follower rollers 63 and 64 which cooperate with template 73, may, when a workpiece 4 is to be replaced, also cooperate with guides, respectively 104 and 105.

Finally the device is completed with a magazine schematically represented at 106 and which contains a supply of workpieces to be machined. Said magazine is respresented schematically in FIGS. 18 and 19 by having a base plate 107 and guides 108 between which the workpieces are placed.

The working of the device is quite simple and as follows:

At the beginning of a working cycle, the carriages 39-40 are as represented in FIG. 19. The gripping device is then open, in other words the gripping rod 78 is pulled up and the milling cutters 59 and 60 are set aside because the follower rollers 63 and 64 have placed themselves against the guides 104 and 105, which was obtained by suitably influencing the jacks 45 and 46.

A workpiece 4 is now supplied by the filling magazine 106 into the open gripping device, i.e., between the parts 74 and 78, after which the piston 83 is moved downwards and thus the workpiece 4 is gripped between the pressing sleeve 74 and the pressure rod or sleeve 78.

By means of electric and/or pneumatic end switches, the jacks 45 and 46 are then influenced, so that the piston rods 43 and 44 are moved outwards to forwardly displace the cariages 39 and 40 thereby bringing the milling cutters 59 and 60 next to the workpiece and the follower rollers 63 and 64 against the aforesaid template 73.

Simultaneously the workpiece is driven from the motor 70, through the reduction box 65 and the shaft portion 71, and thus acquires a constant rotary movement.

As the swinging arms 53 and 54 cooperate with the cutter heads 55 and 56 and the milling cutters 59 and 60 with the follower rollers 63 and 64 which follow the template 73, the milling cutters 59 and 60 are positively controlled so that they mill the piece of work according to the peripherical shape of the template 73, while the profile of the piece of work is determined by the accordingly choosen profile of the milling cutters 59 and 60.

Obviously the contact between the rollers 63 and 64 and the template 73 is ensured by means, such as springs, pneumatic or hydraulic jacks, etc. For the sake of clearness they are not represented in the appended drawings.

The additional movements of the milling devices according to the present invention, which depend from the way of working, kind of materials, shape to be milled, etc., of the workpiece, are imparted as follows:

The cams 76 and 77 are driven together with the gripping device 71 and 78, though the axle portion 72 of the reduction box 65, said cams acting on the follower rollers 87 and 88. As a result, the levers 89 and 90 undergo a certain angular displacement, so that, through the shafts 91 and 92, the levers 98–99 get an equally large angular displacement.

The follower rollers 100–101, carried by levers 98–99, act at that moment on the abutments 102–103 and thereby push the plate 39 with the milling cutter 59 and the plate 40 with the milling cutter 60, either forward or backwards, depending on the shape of the cams 76 and 77.

The shape of these cams has been obviously choosen beforehand in function of the kind, material and other requirements of the workpiece to be milled.

It is well within the skill of one versed in the art to determine the configuration and shape of the cams 76 and 77 according to the shape of a particular workpiece and to form the cams to the correct configuration so that the further movement of the cutters along the workpiece will be imparted in such a direction and at such a rate of speed that the feed rate of the cutters relative to workpiece will remain substantially constant. The configuration of cams 76 and 77 for a particular workpiece may be determined by conventional means known to one skilled in the art from the configuration of the workpiece shape control cam or template, or from the shape of a finished workpiece. Obviously, as the radial distance between the axis of rotation of the workpiece and the cutter increases or decreases, the further movement imparted to the cutter will be in a direction counter to the direction of rotation of the workpiece or in the same direction as the direction of rotation of the workpiece, respectively.

Through the thus obtained relative displacement of milling cutter and workpiece, the feeding velocity of the milling operation can be so controlled that the milling cutter is practically constantly loaded and also that the milled surface is completely clean.

For displacing the plates 39 and 40, the jacks 45–46 serve as springs assuring the contact between the stops 102 and 103 and the rollers 100–101.

When the workpiece is milled over its whole periphery, the motor 70 is stopped, causing the gripping device 74–78 to also come to a stop.

The upper gripping sleeve or rod 78 is then moved upwards by means of the piston 83 and, simultaneously, the carriages 39 and 40 are pulled backwards by the jacks 45 and 46. During this backward movement of the plates 39 and 40, the follower rollers 63 and 64 again contact the guides 104–105, so that the milling cutters are withdrawn from the workpiece.

When the carriages 39 and 40 are moved backward, the feeding mechanism of the magazine 106 comes into operation, so that a new workpiece is fed to the gripping device 74–78 and the milled workpiece 4 is automatically ejected, so that e.g., it reaches a discharge gutter 109, thus leaving the machine.

From then on the above described cycle is repeated.

The swinging shafts 53 and 54 will be preferably provided with height adjustment means, so that the milling cutters may be exactly adjusted to each other.

The swinging shafts 53 and 54 could also be provided with suitable means, e.g., a follower roller cooperating with a cam or template for vertical displacement of the milling cutters during the milling operation. In this way non-straight, more particularly non-plain workpieces can be profiled nevertheless.

The present invention is by no means limited to the embodiments described hereabove and represented in the accompanying drawings, but such improvements according to the invention, i.e., such relative displacement between the workpiece to be milled and the milling tools, may be obtained in every suitable way and with all suitable means without departing from this invention.

What I claim is:

1. Automatic milling machine for giving a workpiece a predetermined shape, comprising:
    at least one milling cutter;
    first driving means to rotate said milling cutter about its axis at a constant velocity;
    second driving means to rotate said workpiece at a constant velocity;
    a first path indicating means having a predetermined path shape corresponding to said predetermined workpiece shape;
    third means controlled by said first path indicating means for moving said cutter along said workpiece in such a way that the latter is milled in accordance with said path shape;
    a second path indicating means; and
    fourth means controlled by said second path indicating means for imparting further movement of said cutter along said workpiece in such a direction and at such a rate of speed that the feed rate of said cutter relative to said workpiece remains substantially constant.

2. Automatic milling machine according to claim 1, wherein said third means include a swinging lever carrying at one end said cutter and said fourth means include a slide hingedly connected to said swinging lever at the end thereof opposite said cutter.

3. Automatic milling machine for giving a workpiece a predetermined shape, including:
    at least one milling cutter; means for rotating said cutter at a constant angular velocity on a cutter support;
    a workpiece; means for rotating said workpiece at a constant angular velocity;

a first rotatable cam the axis of which is co-axial with that of said workpiece and having a path shape corresponding to said predetermined shape;

a first cam follower means the position of which is controlled by said rotatable first cam for moving said cutter support and said cutter along said workpiece in such a way that the latter is milled in accordance with the path shape of said first cam, the axis of said first cam follower being co-axial with that of said cutter;

a rotatable second cam;

a second cam follower means the position of which is controlled by said rotatable second cam; and means operably connecting said second cam follower means with said milling cutter support for imparting further movement of said cutter along said workpiece in such a direction and at such a rate of speed that the feed rate of said cutter relative to said workpiece is substantially constant.

4. Automatic milling machine according to claim 3, wherein said first cam follower means includes a first swinging lever carrying said cutter and said first cam follower.

5. Automatic milling machine according to claim 4, wherein said means operably connecting said second cam follower means with said milling cutter support includes a slide hingedly connected with said first swinging lever.

6. Automatic milling machine according to claim 4, wherein said means operably connecting said second cam follower means with said milling cutter support includes a second swinging lever operably connected with said first swinging lever and carrying said second cam follower.

7. Automatic milling machine according to claim 6, wherein said means operably connecting said second cam follower means with said milling cutter support further includes a slide hingedly connected with said first swinging lever and movably connected with said second swinging lever.

8. Automatic milling machine according to claim 7, wherein said movable connection between said slide and said second swinging lever includes abutment means on the slide and following roller means on the second swinging lever.

9. Automatic milling machine according to claim 3, which includes a fixed cam spaced laterally from the first rotatable cam and engagable by the first cam follower means for moving the cutter laterally away from the workpiece, and means for moving said first cam follower means between said first rotatable cam and said fixed cam.

10. Automatic milling machine according to claim 5, which includes a fixed cam spaced laterally from the first rotatable cam and engagable by said first cam follower means for moving the cutter laterally away from the workpiece, and means for moving said slide and said first cam follower means between said first rotatable cam and said fixed cam.

* * * * *